Patented Sept. 5, 1922.

1,428,273

UNITED STATES PATENT OFFICE.

WILLIAM A. COLLINGS, OF KANSAS CITY, MISSOURI.

PAINT VEHICLE.

No Drawing. Application filed February 28, 1922. Serial No. 539,916.

*To all whom it may concern:*

Be it known that I, WILLIAM A. COLLINGS, a citizen of the United States, residing at Kansas City, in the county of Jackson and State of Missouri, have invented certain new and useful Improvements in Paint Vehicles, of which the following is a specification.

This invention relates to paint vehicle. It comprises as a new drying and hardening coating material a petroleum distillate of high iodin number, say, above 50, containing a metal soap in colloidal suspension; and it further comprises a method of making such a preparation wherein a petroleum oil of relatively high iodin number is distilled, if not already a distillate, to free it of waxes, asphalts, etc., and is then colloided by the solution of a metal soap therein; all as more fully hereinafter set forth and as claimed.

The extensive employment of linseed oil and other drying vegetable oils for paint and varnish purposes is, of course, based on their power of taking oxygen from the air and being thereby converted into more or less rubbery solids; the liquid linseed oil becoming rubbery linoxin. These oils owe their drying properties to the presence of certain "unsaturated groups"; bodies chemically unsaturated and capable of combining readily with oxygen. There are, however, not wholly satisfactory for use with some pigments of a basic nature for the reason that they are saponifiable; are capable of being broken up by bases with formation of soaps and liberation of glycerin. In particular, their use is not desirable with some cheap pigments of a calcareous nature, such as lime, carbonate of lime, cement, etc. They are also relatively costly. It is the purpose of the present invention to provide a drying oil of a relatively inexpensive type and of non-saponifiable nature, capable of being used with these pigments and with a variety of other materials exercising an injurious action upon linseed oil and the like.

There are many mineral oil products and distillates of a drying nature; that is containing unsaturated groups capable of taking up atmospheric oxygen and "drying" therewith. The unsaturated character of an oil is indicated by its iodin number; a high degree of unsaturation corresponding to a high iodin number and vice versa. Another test often used is the ability of an oil to develop heat with sulfuric acid; a great development of heat corresponding to a high iodin number. In the present invention I utilize petroleum or shale oils of this type; advantageously using an oil with an oidin number of at least 50. Oils of high iodin number, however, often contain asphalts, waxes, etc., which are not here desirable. Therefore I customarily distil the oil, if it be not already a distillate, to free it from these bodies.

Distilled petroleum oils, however, with an iodin number of 50 or more are in general too thin, that is too fluid, for my purposes. A certain amount of thickness or viscosity is necessary in an oil to be used for varnish purposes or as a vehicle for paints. I therefore ordinarily thicken the oil somewhat to give it a viscosity and consistence adapted for brush work. To some extent, this may be done by air blowing the oil while warm; this also improving its chemical properties for the present purposes. But, ordinarily, I also use a metal soap which is insoluble in water. Many of the metal soaps of this kind, which are in themselves desirable bodies for coating purposes, when warmed with these oils go into solution or pseudo-solution, forming colloid dispersions or emulsions of good mechanical properties for the present purposes. So to speak, these additions "jellify" the oil to a greater or less extent. Ordinarily, I employ aluminum soaps and I regard these as particularly desirable for my purposes. Aluminum stearate, palmitate, oleate, linolate, etc., may be used. These metal soaps contribute much to the waterproof nature of the resulting paint oil. With these soap additions may be used small amounts of the usual driers employed with linseed oil paints, such as cobalt or manganese linoleate, manganese acetate, manganese borate, etc., to accelerate drying. Certain pitches or resins from vegetable sources may be used for the same purposes, as may a small admixture of turpentine. Pine oil may be used. I find particularly applicable a pitch or resin from the Douglas fir growing on the Pacific coast. This pitch, although not now generally used for any purpose and therefore cheap, is particularly desirable in the present material.

An advantageous type of oil for my purposes may be recovered from acid sludge. In the treatment of various petroleum oils with sulfuric acid for the purpose of purification, it is customary to agitate the oil with the acid for a time, agitation being ordinarily by air blowing. The acid is converted into and separated as "acid sludge" and this sludge on dilution sets free a certain amount of oil. This is sludge oil and is particularly adapted for my purposes. Prior to use, I customarily distil it. The higher boiling fractions of the distillate are those I usually employ. In distillation a current of air may be used to aid in bringing over the oils. The selected fraction may be air blown for a time while warm.

Thickening of the oil is accomplished by stirring into it while warm the proper amount (for the consistency desired) of a dry, finely powdered metal soap, such as aluminum stearate. With the thickened oil, pigment may be admixed in the ways usual in making other paints, such as linseed oil paints.

The present improved drying oil is particularly useful in cement and lime paints; but its applicability is by no means restricted thereto. It may be used for general paint and varnish purposes. However, its non-saponifying properties are best utilized in paints containing lime or calcium carbonate or cement or other basic bodies.

In a specific embodiment of the present invention utilizing sludge oil, I distil sludge oil at a temperature of 180 to 220° C. It may be blown over with steam or taken over by air or under vacuo. I frequently air blow the condensate, warm or hot, for several hours, as I find that this often improves the setting and drying qualities of the oil. The particular temperature used depends upon the character of the oil and is frequently between 40 and 50° C., although at times I carry the temperature much higher; sometimes as high as 200° C. The distillate is then mixed with a little drier, such as manganese acetate, cobalt linoleate, etc. A little turpentine or readily oxidizable pitch may be employed in addition to, or instead of, these driers. The Douglas fir pitch already mentioned I regard as highly desirable as an addition. With this oil, I next incorporate, say, about 3 per cent of commercial aluminum stearate, or other colloiding or jellifying material of similar properties, warming the two together for about 30 minutes under agitation. Incorporation can be at a comparatively low temperature or even in the cold; but is then slower.

Oil prepared as described makes a paint which can be safely applied to concrete surfaces, stucco, etc.

What I claim is:—

1. As a new vehicle for paint and varnish purposes, a mineral oil of high iodin number containing an incorporated water-insoluble metal soap.

2. As a new vehicle for paint and varnish purposes, a mineral oil of high iodin number containing an incorporated aluminum soap.

3. As a new vehicle for paint and varnish purposes, a mineral oil of high iodin number thickened by a solution of a water-insoluble metal soap therein and also containing a drier.

4. As a new vehicle for paint and varnish purposes, a mineral oil of high iodin number thickened by a solution of a water-insoluble metal soap therein and also containing a drier, such drier comprising the pitch of the Douglas fir.

5. The process of making an improved oil product useful as a vehicle for paint and varnish, which comprises distilling a mineral oil of high iodin number to free it of contained pitchy or waxy matter, and incorporating a water-insoluble metal soap therein.

6. The process of making an improved oil product useful as a vehicle for paint and varnish, which comprises distilling a mineral oil of high iodin number to free it of contained pitchy or waxy matter, and incorporating an aluminum soap therein.

7. The process of making an improved oil product useful as a vehicle for paint and varnish, which comprises air blowing a petroleum distillate of high iodin number and incorporating a water-insoluble metal soap therein.

8. The process of making an improved oil product useful as a vehicle for paint and varnish which comprises distilling sludge oil, air blowing the higher boiling fractions and incorporating a water-insoluble metal soap therein.

9. The process of making an improved oil product useful as a vehicle for paint and varnish, which comprises distilling sludge oil, air blowing the higher boiling fractions and incorporating an aluminum soap therein.

10. As a new vehicle for paint and varnish purposes, a mineral oil of high iodin number containing an incorporated colloiding material imparting a jellied and viscous character thereto.

In testimony whereof, I have hereunto affixed my signature.

WILLIAM A. COLLINGS.